(12) United States Patent
Long et al.

(10) Patent No.: US 6,521,559 B1
(45) Date of Patent: Feb. 18, 2003

(54) SUPERIOR PILLARED CLAY CATALYSTS FOR SELECTIVE CATALYTIC REDUCTION OF NITROGEN OXIDES FOR POWER PLANT EMISSION CONTROL

(75) Inventors: Ruiqiang Long, Ann Arbor, MI (US); Ralph T. Yang, Ann Arbor, MI (US); Kent D. Zammit, Menlo Park, CA (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/580,382

(22) Filed: May 26, 2000

Related U.S. Application Data
(60) Provisional application No. 60/156,263, filed on Sep. 27, 1999.

(51) Int. Cl.[7] ................................................. B01J 21/16
(52) U.S. Cl. ...................................................... 502/84
(58) Field of Search ................... 502/80, 84; 423/239.1

(56) References Cited

U.S. PATENT DOCUMENTS

| | | | |
|---|---|---|---|
| 4,176,090 A | 11/1979 | Vaughan et al. | 252/455 Z |
| 4,855,268 A | 8/1989 | Raythatha | 502/63 |
| 4,995,964 A | 2/1991 | Gortsema et al. | 208/112 |
| 5,095,568 A | 3/1992 | Thomas et al. | 5/453 |
| 5,415,850 A * | 5/1995 | Yang et al. | 423/239.1 |
| 5,614,453 A | 3/1997 | Occelli | 502/66 |

OTHER PUBLICATIONS

Umit S. Ozkan, et al. "Investigation of the Reaction Pathways in Selective Catalytic Reduction of NO with $NH_3$ over $V_2O_5$ Catalysts: Isotopic Labeling Studies Using $^{18}O_2$, $^{15}NH_3$, $^{15}NO$, and $^{15}N^{18}O^{1}$", Journal of Catalysis, 1994, vol. 149, pp. 390–403.

Nan–Yu Topsøe, "Mechanism of the Selective Catalytic Reduction of Nitric Oxide by Ammonia Elucidated by Situ On–Line Fourier Transform Infrared Spectroscopy", Science, Aug. 26, 1994, vol. 265, pp. 1217–1219.

N–Y Topsøe, et al. "Vanadia/Titania Catalysts for Selective Catalytic Reduction of Nitric Oxide by Ammonia", Journal of Catalysis, 1995, vol. 151, pp. 241–252.

R.T. Yang, et al. "Pillared Clays as Superior Catalysts for Selective Catalytic Reduction of NO with $NH_3$", Ind. Eng. Chem. Res., 1992, vol. 31, pp. 1440–1445.

J.P. Chen, et al. "Mechanism of Poisoning of the $V_2O_5/TiO_2$ Catalyst for the Reduction of NO by $NH_3$", Journal of Catalysis, 1990, vol. 125, pp. 411–420.

Jean W. Beeckman, et al. "Design of Monolith Catalysts for Power Plant $NO_x$ Emission Control", Ind. Eng. Chem. Res. 1991, vol. 30, pp. 969–978.

Akira Kato, et al. "Activity and Durability of Iron Oxide–Titanium Oxide Catalysts for NO Reduction with $NH_3$", Ind. Eng. Chem. Prod. Res. Dev. 1983, vol. 22, pp. 406–410.

Wing. C. Wong, et al. "Reduction of NO with $NH_3$ on $Al_2O_3-$ and $TiO_2-$Supported Metal Oxide Catalysts", Ind. Eng. Chem. Prod. Res. Dev. 1986, vol. 25, pp. 179–186.

(List continued on next page.)

Primary Examiner—Stanley S. Silverman
Assistant Examiner—Maribel Medina
(74) Attorney, Agent, or Firm—Dorsey & Whitney LLP

(57) ABSTRACT

The present invention provides a catalyst for selective catalytic reduction of nitrogen oxide compounds with ammonia comprising a composition of one or more pillared interlayered clays, one or more metal ions exchanged with the pillared interlayered clays, and one or more promoter ions exchanged with the pillared interlayered clays. Specifically, the pillared interlayered clay (PILC) catalysts of the present invention include $Fe^{3+}$, $Cr^{3+}$, $Mn^{2+}$, $Co^{2+}$, $Cu^{2+}$, and $Ni^{2+}$ exchanged $Al_2O_3$-PILC, $TiO_2$-PILC, $ZrO_2$-PILC or $SiO_2$-PILC catalysts. The promoters include Ce, La, Pr, Th and Nd. These pillared clay catalysts of the present invention show remarkable activity for the SCR reaction.

12 Claims, 4 Drawing Sheets

OTHER PUBLICATIONS

J.P. Chen, et al. "Delaminated $Fe_2O_3$–Pillared Clay: Its Preparation, Characterization, and Activities for Selective Catalytic Reduction of NO by $NH_3$", Journal of Catalysis, 1995, vol. 151, pp. 135–146.

Johan Sterte, "Synthesis and Properties of Titanium Oxide Cross–Linked Montmorillonite", Clays and Clay Minerals, 1986, vol. 34, No. 6, pp. 658–664.

Gerard Tuenter, et al. "Kinetics and Mechanism of the $NO_x$ Reduction with $NH_3$ on $V_2O_5$–$WO_3$–$TiO_2$ Catalyst", Ind. Eng. Chem. Prod. Res. Dev. 1986, vol. 25, pp. 633–636.

Joseph R. Kiovsky, et al. "Evaluation of a New Zeolitic Catalyst for $NO_x$ Reduction with $NH_3$", Ind. Eng. Chem. Prod. Res. Dev. 1980, vol. 19, pp. 218–225.

Bronwyn L. Duffy, et al. "$^{15}$N–Labelling Studies of the Effect of Water on the Reduction of NO with $NH_3$ over Chromia SCR Catalysts in the Absence and Presence of $O_2$", Journal of Catalysis, 1995, vol. 154, pp. 107–114.

H. Schneider, et al. "Chromia on Titania", Journal of Catalysis, 1994, vol. 147, pp. 545–556.

Kazushi Arata, "Solid Superacids", Advances in Catalysis, 1990, vol. 37, pp. 165–211.

F.T. Clark, et al. "Interactions in Alumina–Based Iron Oxide–Vanadium Oxide Catalysts under High Temperature Calcination and $SO_2$ Oxidation Conditions", Journal of Catalysis, 1993, vol. 139, pp. 1–18.

Ralph T. Yang, et al. "Ion–Exchanged Pillared Clays: A New Class of Catalysts for Selective Catalytic Reduction of NO by Hydrocarbons and by Ammonia", Journal of Catalysis, 1995, vol. 155, pp. 414–417.

* cited by examiner

SUPERIOR PILLARED CLAY CATALYSTS FOR SELECTIVE CATALYTIC REDUCTION OF NITROGEN OXIDES FOR POWER PLANT EMISSION CONTROL

RELATED APPLICATIONS

This application claims priority to U.S. Provisional Patent Application, Serial No. 60/156,263 filed Sep. 27, 1999, the entire disclosure of which is hereby incorporated by reference.

FIELD OF THE INVENTION

This invention relates in general to the controlling of nitrogen oxide ($NO_x$) emissions from fossil-fuel power plants. More particularly, the invention relates to a catalyst composition for controlling nitrogen oxide emissions from fossil-fuel power plants by selective catalytic reduction (SCR) with ammonia using pillared clay catalysts.

BACKGROUND OF THE INVENTION

Nitrogen oxides (NO, $NO_2$, and $N_2O$, collectively referred to as "$NO_x$") present in the exhaust gases from combustion of fossil fuels, continues to be a major source for air pollution. Nitrogen oxides contribute to photochemical smog, acid rain, ozone depletion and greenhouse effects. As a major cause of acid rain, nitrogen oxides additionally contribute to the pollution of water and soil. The current technology for reducing nitrogen oxides emissions from power plants is by selective catalytic reduction (SCR) of $NO_x$ (where x is 1 to 2) with ammonia in the presence of oxygen, to form nitrogen and water. The overall reaction is as follows:

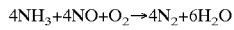

$$4NH_3 + 4NO + O_2 \rightarrow 4N_2 + 6H_2O$$

Many catalysts have been reported to be active for this reaction, such as vanadia and other transition metal oxides (e.g., $V_2O_5$, CuO, $Fe_2O_3$, $Cr_2O_3$, $Fe_2O_3$—$Cr_2O_3$, $Nb_2O_5$, and the like), pillared clays and zeolite-type catalysts. For example, in the SCR reaction, a vanadia catalyst $V_2O_5$+ $WO_3$ (or $MoO_3$) supported on $TiO_2$ is commonly used as commercial catalysts. The mechanism of the reaction on the vanadia catalysts has been studied extensively and is reasonably understood although several different mechanisms have been proposed. Although the SCR technology based on vanadia catalysts has been commercialized, problems with this approach still remain. For example, the vanadia catalyst promotes high activity for the oxidation of $SO_2$ to $SO_3$, promotes formation of $N_2O$ at high temperatures, and is toxic. The formation of $SO_3$ is undesirable because it reacts with $NH_3$ and $H_2O$ to form $NH_4HSO_4$, $(NH_4)_2S_2O_7$ and $H_2SO_4$ which cause corrosion and plugging of the reactor and heat exchangers in the power plant. Hence there are continuing efforts in developing new catalysts.

Pillared interlayered clay (PILC) is a unique two-dimensional zeolite-like material known in the art. Because of its large pores, pillared clays have been evaluated as a possible replacement for zeolite as the catalyst for fluid catalytic tracking (FCC) which operates at near 700° C. with high steam concentration. However, pillared clays were found not to be suitable due to excessive carbon deposition and the limited hydrothermal stability of the pillared clay structure. Pillared clays have also been studied for catalyzed alcohol dehydration, alkylation and other acid catalyzed reactions. Pillared clays have also been evaluated for selective catalytic reduction of $NO_x$, as described in U.S. Pat. No. 5,415,850. Specifically, the '850 patent discusses pillared clay composition doped with certain concentrations of certain metals. While such reported pillared clay catalysts are useful, there is a need in the industry to continue development of catalysts that exhibit improved catalytic activity for selective catalytic reduction of $NO_x$.

OBJECTS AND SUMMARY OF THE INVENTION

Accordingly, it is an object of the present invention to provide an improved catalyst composition for reducing nitrogen oxide emissions.

In summary, the present invention described herein are metal ion exchanged pillared interlayered clay catalysts. More particularly, the present invention provides a catalyst for selective catalytic reduction of nitrogen oxide compounds with ammonia comprising a composition of one or more pillared interlayered clays, one or more metal ions exchanged with the pillared interlayered clays, and one or more promoter ions exchanged with the pillared interlayered clays. Specifically, the pillared interlayered clay (PILC) catalysts of the present invention include $Fe^{3+}$, $Cr^{3+}$, $Mn^{2+}$, $Co^{2+}$, $Cu^{2+}$, and $Ni^{2+}$ exchanged $Al_2O_3$-PILC, $TiO_2$-PILC, $ZrO_2$-PILC, $SiO_2$-PILC and $Fe_2O_3$-PILC catalysts. These ion-exchanged PILCs are further promoted by rare earth metals, such as Ce, La, Pr, Tb and Nd. These pillared clay catalysts of the present invention show remarkable activity for the SCR reaction. Of significant advantage, as compared to prior art commercial catalysts, the pillared clay catalysts of the present invention yield higher activity, reduce the $SO_2$ oxidation of $SO_3$ by up to about 85%, and yield substantially less undesirable $N_2O$.

BRIEF DESCRIPTION OF THE DRAWINGS

Additional objects and advantages of the present invention will become apparent in reading the detailed description of the invention and the claims, and with reference to the figures, in which:

DETAILED DESCRIPTION OF THE INVENTION

Figure 1:
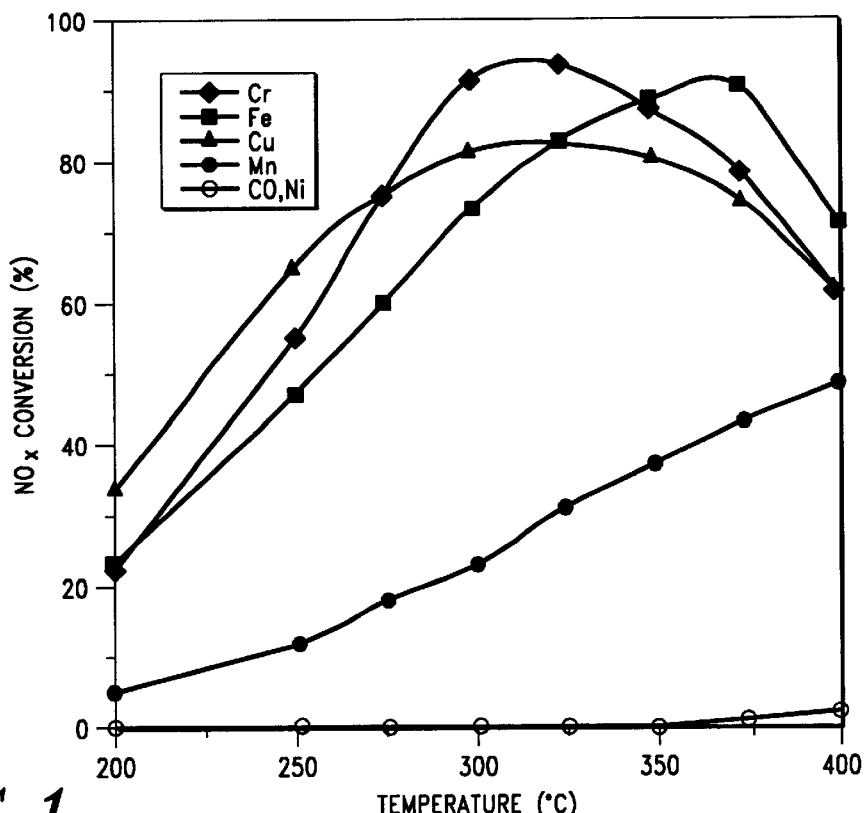
FIG. 1 is a graph showing the catalytic activity of NO reduction by $NH_3$ on $Cr^{3+}$, $Fe^{3+}$, $Cu^{2+}$, $Mn^{2+}$, $Co^{2+}$, and $Ni^{2+}$ ion-exchanged $Al_2O_3$-pillared laponites catalysts according to one embodiment of the present invention. The reaction conditions are: 0.3 g catalyst, [NO]=[$NH_3$]=1000 ppm, [$O_2$]=2%, He=balance, total flow rate=500 ml/min and GHSV=75 000 l/h.

The catalyst composition of the present invention is comprised of metal ion exchanged pillared interlayered clays (PILC), and mixtures thereof. Pillared interlayered clays finding use in the present invention include laponites, bentonites, smectites and phillosilicates. Metals suitable for exchange with said PILCs include $Fe^{3+}$, $Cr^{3+}$, $Mn^{2+}$, $Co^{2+}$ and $Ni^{2+}$. Copper ($Cu^{2+}$) may also be used. Additional metals suitable for exchange include $V^{3+}$, $V^{2+}$ and $VO^{2+}$.

Preferably, the PILCs are pillared with alumina or titania, specifically $Al_2O_3$-PILC or $TiO_2$-PILC. $ZrO_2$, $SiO_2$ and $Fe_2O_3$ pillared clays are also included. More specifically, pillared interlayered clay catalyst compositions of the present invention include $Fe^{3+}$, $Cr^{3+}$, $Cu^{2+}$, $Mn^{2+}$, $Co^{2+}$ and $Ni^{2+}$ exchanged with $Al_2O_3$-PILC , $TiO_2$-PILC, $ZrO_2$-PILC, $SiO_2$-PILC or $Fe_2O_3$-PILC.

The metal ions may be separately exchanged with the pillared clays, or a combination of one or more metal ions may be exchanged. Specific examples include but are not limited to: Fe—$TiO_2$-PILC, Ce—Fe—$TiO_2$-PILC, Fe—$Al_2O_3$-PILC, Cr—$Al_2O_3$-PILC, Cu—$Al_2O_3$-PILC, $CeO_2$/Fe—$TiO_2$-PILC. Preferably the catalyst of the present invention will exhibit a metal exchange level (in percent of ion exchanges) in the range approximately 10% to 400%, more preferably in the range of approximately 100% to 300%, with a metal exchange level of approximately 200% being most preferred. Of particular advantage, the present invention uses a rare earth metal promoter (or dopant). Preferably, cerium, such as $CeO_2$, is used as a promoter which enhances preparation of the catalyst and also increases the longevity of the catalysts. Other active promoters include oxides of La, Pr, Tb, Nd, Sm, Gd, and mixtures thereof. The amount of promoters is in the range of approximately 0.1–4.0% wt., with a range of approximately 1–2% wt. being preferred.

$Fe^{3+}$-exchanged pillared clays were found to be the most active. In addition, the $N_2$/$N_2O$ product selectivity is substantially higher with the catalyst of the present invention than that of the conventional catalysts. The catalytic activity of Fe—$TiO_2$-PILC can be further improved by the addition of the promoter, preferably a small amount of cerium ions or cerium oxide or other rare earth metals. $H_2O$ and $SO_2$ increase both the activity and the product selectivity to $N_2$. Moreover, compared to the conventional $V_2O_5$-$WO_3$/$TiO_2$ catalyst, the catalysts of the present invention show substantially lower activities for $SO_2$ oxidation to $SO_3$ under the same reaction condition and in particular, the Fe—$TiO_2$-PILC catalyst of the present invention shows lower activities of up to about 85% for $SO_2$ oxidation to $SO_3$ as compared to conventional catalysts. The catalysts of the present invention show good stability, for example an 100-hour run in the presence of $H_2O$ and $SO_2$ for the $CeO_2$/Fe—$TiO_2$-PILC catalyst showed no decrease in activity.

The metal ion exchanged pillared interlayered clays of the present invention were prepared using ion exchange procedures. In one embodiment, delaminated $Al_2O_3$-pillared laponite was obtained from Laporte Industries, Ltd. The BET $N_2$ surface area and average pore diameter (measured with a Micromeritics ASAP 2010 micropore size analyzer) were 365 $m^2$/g and 3.2 nm, respectively. In each experiment, two grams of the delaminated $Al_2O_3$-pillared laponite was added to 200 ml of 0.05 M Fe ($NO_3$)$_3$, Cr($NO_3$)$_3$, Cu ($CH_3CO_2$)$_2$, Mn($CH_3$ $CO_2$)$_2$, Co($NO_3$)$_2$, or Ni($NO_3$)$_2$ solution with constant stirring. The mixtures were kept at 50° C. for 6 hours and then the particles were filtered and washed with deionized water. The exchange process was repeated three times. The obtained solid samples were first dried at 120° C. in air for 12 hours, then calcined at 400° C. for 6 hours. The samples were finally ground to 60–140 mesh. $TiO_2$-PILC was synthesized as follows. The starting clay was a purified montmorillonite, i.e., a purified-grade bentonite powder from Fisher Company, with particles less than or equal to 2 $\mu$m. The pillaring agent, a solution of partially hydrolyzed Ti-polycations, was prepared by first adding $TiCl_4$ into a 2 M HCl solution. The mixture was then diluted by slow addition of deionized water with constant stirring to reach a final Ti concentration of 0.82 M. The final concentration of HCl was 0.6 M in the preparation. The solution was aged for more than 8 hours at room temperature prior to its use. Eight grams of bentonite was dispersed in 2.0 L of deionized water and the slurry was stirred for 5 hours. The pillaring solution was slowly added into the suspension of clay with vigorous stirring until the amount of pillaring solution reached that required to obtain a 10 mmolTi/g clay. The resulting product was left in contact with the solution for 18 hours. Subsequently, the clay particles were separated by vacuum filtration and washed with deionized water until the washing liquid was free of chloride ions as indicated by using the silver nitrate test. The sample was dried at 120° C. for 12 hours and then calcined at 350° C. for 12 hours. The BET surface area and average pore size of the $TiO_2$-PILC were 316 $m^3$/g and 3.3 nm, respectively. Iron ion-exchanged $TiO_2$-PILC catalysts of the present invention were prepared according to the procedure described above. Cerium doped Fe—$TiO_2$-PILC catalyst compositions in accordance with another embodiment of the present invention were prepared by using the incipient wetness impregnation method with cerium nitrate as the cerium precursor. In yet another embodiment of the invention, Ce—Fe—$TiO_2$-PILC catalysts were prepared by the following procedure: 2 grams $TiO_2$-PILC was exchanged with cerium ions (using 200 ml 0.02 M Ce($NO_3$)$_3$ solution) for 20 hours, then exchanged with 0.05 M Fe($NO_3$)$_3$ solution for 6 hour and repeated twice at room temperature.

In addition to the pillared clay catalysts of the present invention, conventional $V_2O_5$—$WO_3$/$TiO_2$ catalysts (4.4%$V_2O_5$-8.2%$WO_3$/$TiO_2$) were tested for comparison. The catalysts of the present invention were prepared by incipient wetness impregnation as previously described. The $V_2O_5$—$WO_3$/$TiO_2$ catalyst had the same composition and surface area as a European commercial SCR catalyst as described by Tuenter et al. Also, this catalyst had nearly identical SCR activity and behavior as that of the same conventional SCR catalyst made by a major catalyst manufacturer.

The catalytic activity was evaluated by SCR activity measurements carried out in a fixed-bed quartz reactor. The reaction temperature was controlled by an Omega (CN-2010) programmable temperature controller. About 0.2 g or 0.3 g of sample was used in the experiments. Flue gas was simulated by blending different gaseous reactants. Two sets of flow meters were used to control the flow rates of the individual reactants. High flow rate gases (i.e., He, $NH_3$/He, or NO/He) were controlled by rotameters, whereas the low flow rate gases (i.e., $SO_2$, $O_2$) were controlled by mass flow meters (FM 4575 Linde Division). The typical reactant gas composition was as follows: 1000 ppm NO, 1000 ppm $NH_3$, 2% $O_2$, 1000 ppm $SO_2$ (when used), 8% water vapor (when used), and balance He. The total flow rate was 500 ml/min (ambient conditions). The premixed gases (1.01% NO in He, 0.98% in NH3 in He, and 0.99% $SO_2$ in He) were supplied by Matheson Company. Water vapor was generated by passing He through a heated gas-wash bottle containing deionized water. The tubings of the system were wrapped with heating tapes to prevent the formation and deposition of ammonium sulfate or ammonium nitrate. The NO and $NO_2$ concentrations were continuously monitored by a chemiluminescent NO/$NO_x$ analyzer (Thermo Electron Corporation, Model 10). To avoid errors caused by the oxidation of ammonia in the converter of the NO/$NO_x$ analyzer, an ammonia trap containing phosphoric acid solution was installed before the sample inlet to the chemiluminescent analyzer. The products were also analyzed by a gas chromatograph (Shimadzu, 14A) at 50° C. with 5A molecular sieve column for $N_2$ and Porapak Q column for $N_2O$. Hence the nitrogen balance and the product selectivity for $N_2$ and $N_2O$ could be obtained.

To measure the amount of $SO_3$ from $SO_2$ oxidation during SCR reaction, a conventional wet analysis method was adopted. With the same reactor used for measuring the catalyst SCR activity, the effluent was bubbled through a solution containing $BaCl_2$ and HCl, where $SO_3$ was quantitatively captured and precipitated as $BaSO_4$. The precipitate was collected on an ashless filter paper which was burned along with the precipitate in a crucible, so the amount of the precipitate was accurately measured.

Figure 2:
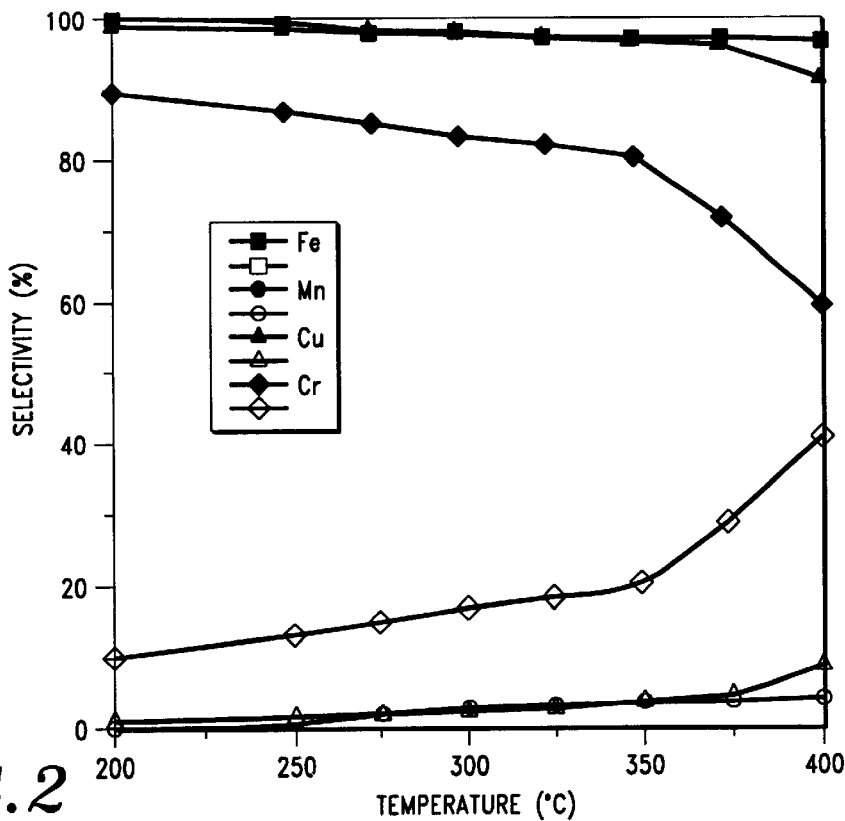
FIG. 2 is a graph illustrating product selectivity as a function of temperature for $N_2$ (solid symbols) and $N_2O$ (open symbols) for NO reduction by $NH_3$, on $Cr^{3+}$, $Fe^{3+}$, $Cu^{2+}$, $Mn^{2+}$, $Co^{2+}$, and $Ni^{2+}$ ion-exchanged $Al_2O_3$-pillared laponite catalysts according to the present invention. Reaction conditions are the same as in FIG. 1.

The following results were obtained:
SCR Catalytic Activity on Ion-exchanged $Al_2O_3$-pillared Laponites The catalysts compositions of the present invention containing $Fe_2O_3$, $Cr_2O_3$, $Co_3O_4$, NiO, $MnO_x$ or CuO showed high activities for the SCR reaction. Thus, the protons ($H^+$) on the pillared clays were exchanged by the cations of these transition metals as potential catalysts. Ion-exchanged $Al_2O_3$-pillared laponite samples were prepared and the SCR activities on these catalysts are shown in FIG. 1, a graph of $NO_x$ conversion as a function of temperature. Under the conditions of 1000 ppm NO, 1000 ppm $NH_3$, 2% $O_2$ and gas hourly space velocity (GHSV)=75 000 l/h, $Co^{2+}$ and $Ni^{2+}$ exchanged $Al_2O_3$-pillared laponite samples showed little activity in the reduction of $NO_x$ by $NH_3$. A moderate activity was obtained on $Mn^{2+}$-exchanged $Al_2O_3$-PILC catalyst in the temperature range of 200–400° C. Fe—$Al_2O_3$-PILC, Cr—$Al_2O_3$-PILC and Cu—$Al_2O_3$-PILC were found to yield high $NO_x$ conversions for this reaction. These results suggest that metal cations in the $Al_2O_3$-PILC play an important role for the reduction of $NO_x$. The nitrogen balance in this work was better than 95%. The maximum $NO_x$ conversion on the Cr—$Al_2O_3$-PILC catalyst was obtained at 300–325° C. whereas that for Fe—$Al_2O_3$-PILC occurred at 375° C. As shown in FIG. 2, high selectivities for $N_2O$ product were obtained on the $Cr^{3+}$-exchanged $Al_2O_3$-PILC catalyst. The selectivity of $N_2O$ reached approximately 40% at 400° C. While on the other pillared clay catalysts, the selectivities for $N_2O$ were lower than 10% (i.e., the selectivities for $N_2$ were more than 90%) at 200–400° C. The product selectivity for $N_2$ decreased according to the sequence: Fe—$Al_2O_3$-PILC≃Mn—$Al_2O_3$-PILC>Cu—$Al_2O_3$-PILC>>Cr—$Al_2O_3$-PILC. This result was consistent with the previous studies reported in the literature that no significant amount of $N_2O$ was formed on $Fe_2O_3$ catalyst, while a large amount of $N_2O$ (along with $N_2$) was formed on $Cr_2O_3$ doped catalyst ($Cr_2O_3$ existed as crystalline $\alpha$-$Cr_2O_3$, not as amorphous form).

SCR Catalytic Activity on Fe—$TiO_2$-PILC

Figure 3:
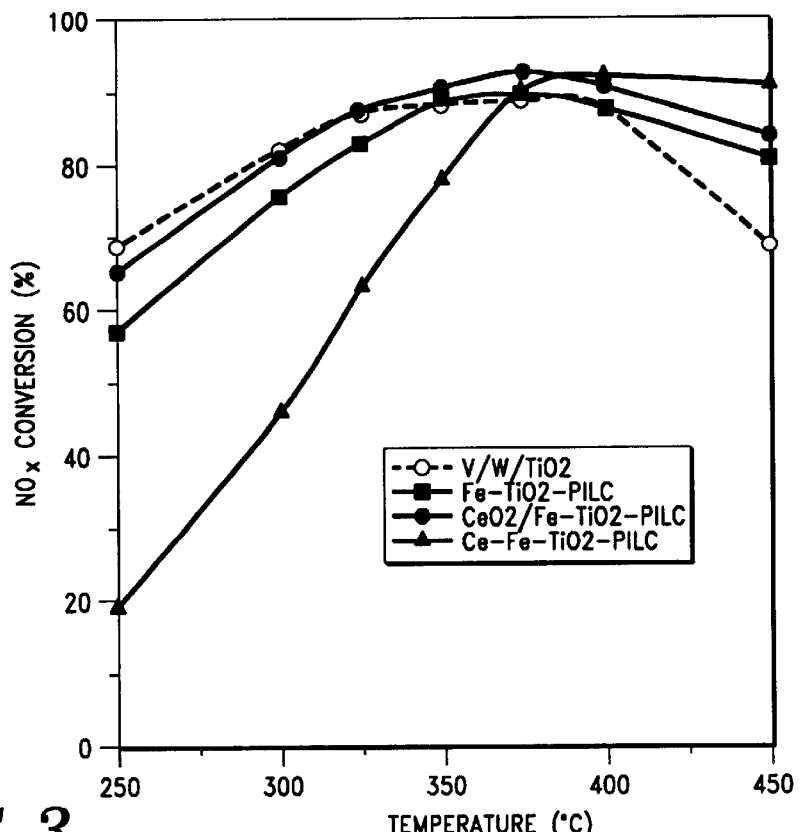
FIG. 3 shows catalytic activity of NO reduction by $NH_3$ on Fe—$TiO_2$-PILC, 1.0% $CeO_2$/Fe—$TiO_2$-PILC, and Ce—Fe—$TiO_2$-PILC catalysts according to another embodiment of the present invention and is compared with a conventional 4.4%$V_2O_5$-8.2%$WO_3$/$TiO_2$ catalyst in the absence of $H_2O$ and $SO_2$. The reaction conditions are: 0.2 g catalyst (except 0.1 g for Ce—Fe—$TiO_2$-PILC), [NO]= [$NH_3$]=1000 ppm, [$O_2$]=2%, He=balance and total flow rate=500 ml/min.
Figure 4:
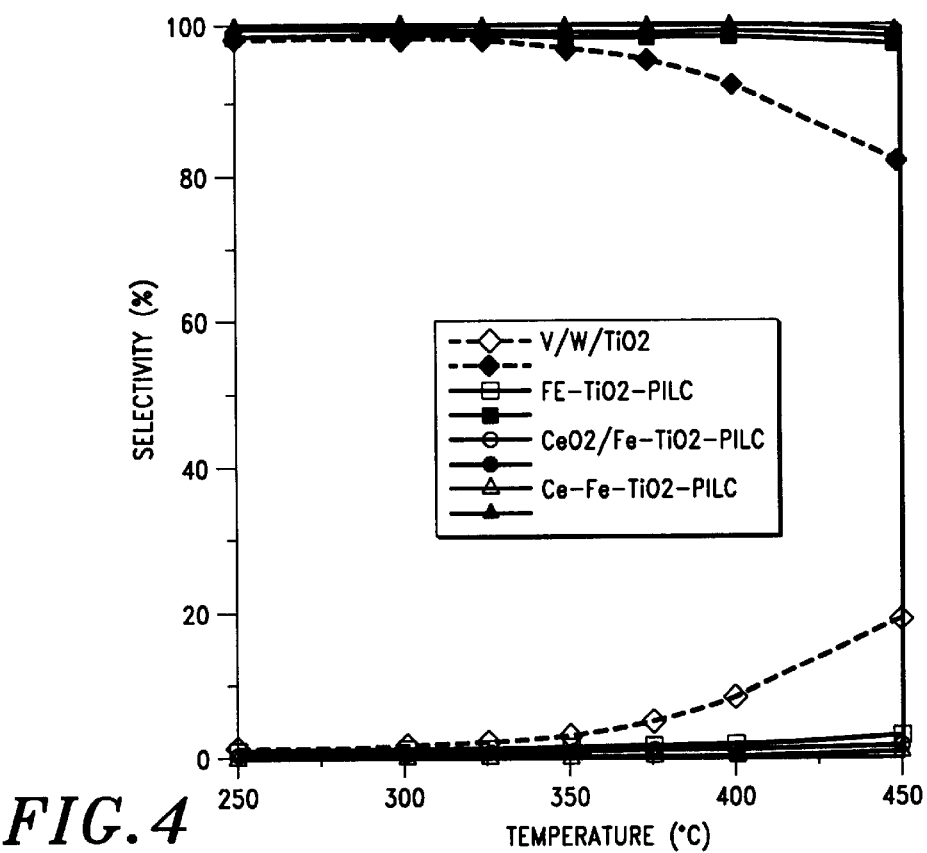
FIG. 4 demonstrates the product selectivity for $N_2$ (solid symbols) and $N_2O$ (open symbols) for NO reduction by $NH_3$ on Fe—$TiO_2$-PILC, 1.0% $CeO_2$/Fe—$TiO_2$-PILC, and Ce—Fe—$TiO_2$-PILC catalysts according to one embodiment of the present invention, and compared with a conventional 4.4%$V_2O_5$-8.2%$WO_3$/$TiO_2$ catalyst in the absence of $H_2O$ and $SO_2$. Reaction conditions are the same as in FIG. 3.

Of particular advantage the $Fe^{3+}$-exchanged $Al_2O_3$-pillared laponite showed good $NO_x$ reduction activity and high selectivity for $N_2$ formation, thus we further investigated the catalytic performance of $Fe^{3+}$-exchanged $TiO_2$-pillared bentonite for the SCR reaction. A conventional 4.4%$V_2O_5$-8.2%$WO_3$/$TiO_2$ catalyst was also used as a control for comparison. Under the conditions of 1000 ppm NO, 1000 ppm $NH_3$, 2% $O_2$ and GHSV=113 000 l/h, the Fe—$TiO_2$-PILC catalyst composition of the present invention showed high $NO_3$ conversions at 250–450° C. as illustrated in FIG. 3. The $NO_3$ conversion increased with temperature at first, passing through a maximum at 375° C., then decreased slightly at higher temperatures. At above 350° C., the activities of the Fe—$TiO_2$-PILC catalyst were better than those of the conventional 4.4%$V_2O_5$-8.2%$WO_3$/$TiO_2$ catalyst. When 1.0%$CeO_2$ was doped on the Fe—$TiO_2$-PILC sample, the activities for $NO_x$ reduction were further increased. This indicated that cerium oxide played an important promoting role in the SCR reaction on the Fe—$TiO_2$-PILC catalyst. The Ce—Fe—$TiO_2$-PILC catalyst of the present invention showed the best activities for $NO_x$ conversion at higher temperatures, although only half the amount of catalyst was used in this work. As shown in FIG. 4, the selectivities for $N_2$ on the three Fe—$TiO_2$-PILC catalysts were both significantly better than those of the conventional 4.4%$V_2O_5$-8.2%$WO_3$/$TiO_2$ catalyst, especially at higher temperatures. It is also significant to notice the wider temperature window of the pillared clay catalyst, especially at 400–450° C.

Figure 5:
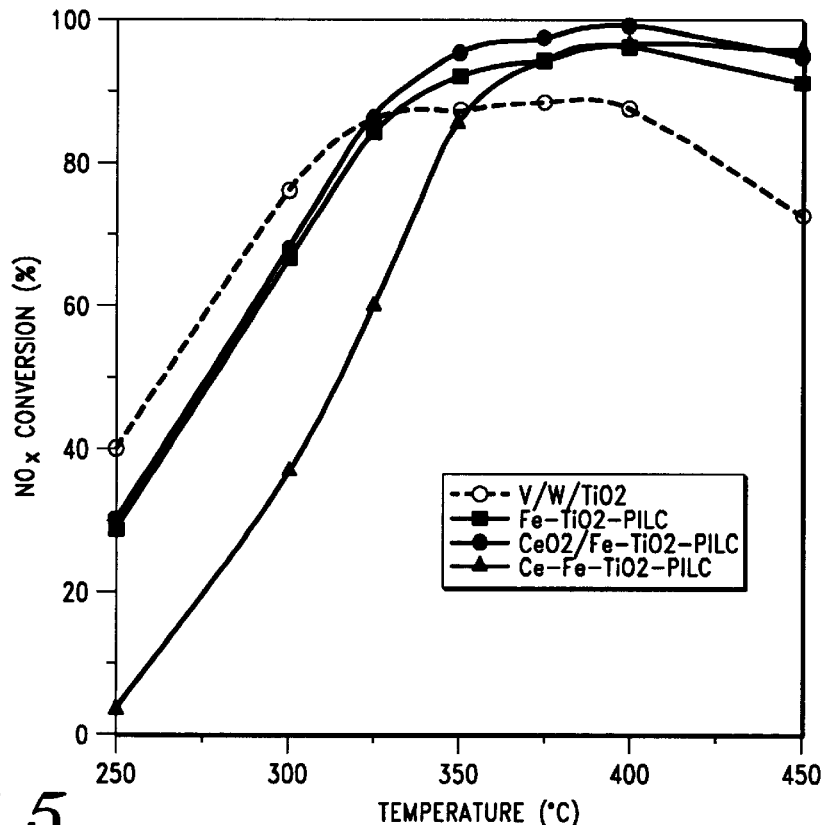
FIG. 5 is a graph showing the catalytic activity of NO reduction by $NH_3$ on Fe—$TiO_2$-PILC, 1.0-% $CeO_2$/Fe—$TiO_2$-PILC, and Ce—Fe—$TiO_2$-PILC catalysts according to another embodiment of the present invention, and compared with a conventional 4.4%$V_2O_5$-8.2%$WO_3$/$TiO_2$ catalyst in the presence of $H_2O$ and $SO_2$. The reaction conditions are: 0.2 g catalyst (except 0.1 g for Ce—Fe—$TiO_2$-PILC), [NO]=[$NH_3$]=1000 ppm, [$O_2$]=2%, [$H_2O$]=8%, [$SO_2$]=1000 ppm. He=balance and total flow rate=500 ml/min.
Figure 6:
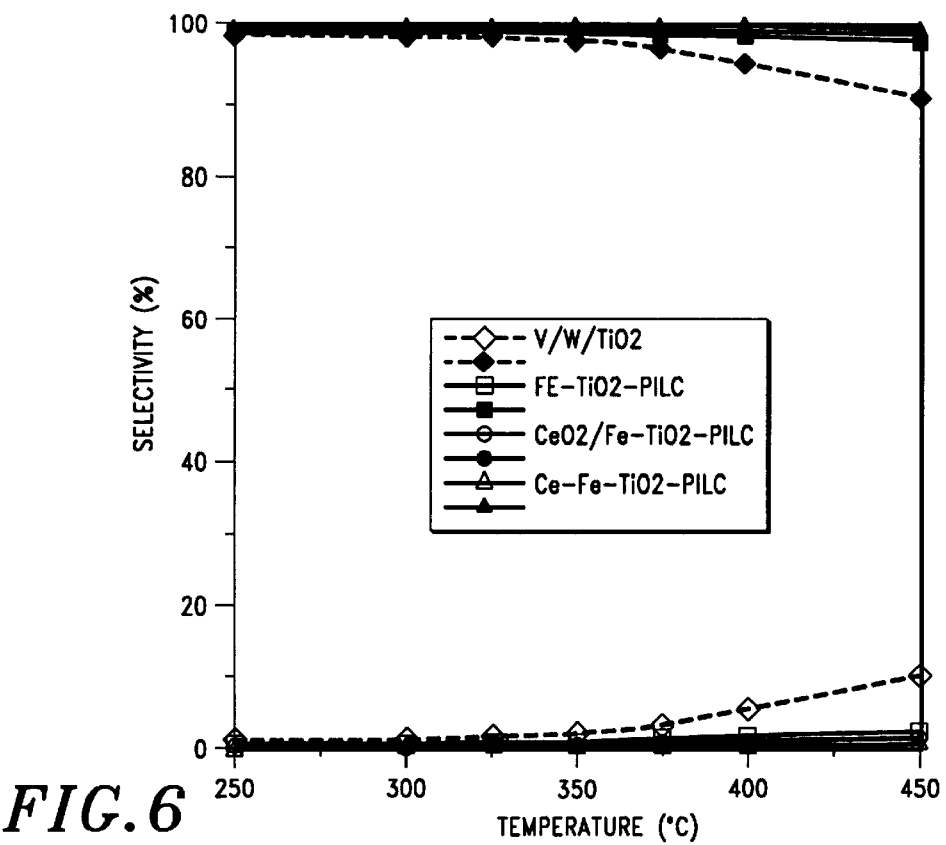
FIG. 6 is a graph illustrating product selectivity for $N_2$ (solid symbols) and $N_2O$ (open symbols) for NO reduction by $NH_3$ on Fe—$TiO_2$-PILC, 1.0% and $CeO_2$/Fe—$TiO_2$-PILC catalysts according to the present invention and compared with conventional 4.4%$V_2O_5$-8.2%$WO_3$/$TiO_2$ catalysts in the presence of $H_2O$ and $SO_2$. Reaction conditions are the same as in FIG. 5.

Due to the large amount of water vapor and sulfur dioxide (along with $NO_x$, $O_2$ and other gases) in the combustion gases from stationary sources, resistance to $H_2O$ and $SO_2$ is an important criteria for catalysts used in the SCR reaction. Accordingly, the effects of $H_2O$ and $SO_2$ on the catalytic performance of the catalyst compositions of the present invention, in particular three Fe—$TiO_2$-PILC catalysts, were studied and compared to a conventional 4.4%$V_2O_5$-8.2%$WO_3$/$TiO_2$ catalyst. After 8% $H_2O$ and 1000 ppm $SO_2$ were added to the reactants, the $NO_x$ conversions decreased at low temperatures (below 325° C.) on all the catalysts (comparing FIG. 5 with FIG. 3). At above 325° C., $H_2O$ and $SO_2$ did not influence the activities of the conventional 4.4%$V_2O_5$-8.2%$WO_3$/$TiO_2$ catalyst for the SCR reaction. In contrast, however, on the three Fe—$TiO_2$-PILC catalysts of the present invention, $NO_x$ conversions increased at above 325° C. in the presence of $H_2O$ and $SO_2$. These results also indicated that the three Fe—$TiO_2$-PILC catalysts of the invention were much more active than the conventional 4.4%$V_2O_5$-8.2%$WO_3$/$TiO_2$ catalyst, for the SCR reaction in the presence of $H_2O$ and $SO_2$. One possible theory is that both sulfated iron oxide and sulfated titanium oxide are known as solid superacid. When $H_2O$ and $SO_2$ were added to the reactants, some $SO_2$ was oxidized to $SO_3$ by $O_2$ at the SCR temperatures and thus led to the formation of sulfate ions on the catalysts. This would increase the acidity of the catalysts containing iron and titania and thus give rise to an increase in the catalytic activity, because Brønsted acidity is important for the SCR reaction. $H_2O$ and $SO_2$ also increased the product selectivities to $N_2$ slightly on the three catalysts of the invention, which may be attributed to a decrease of $NH_3$ oxidation by $O_2$.

Figure 7:
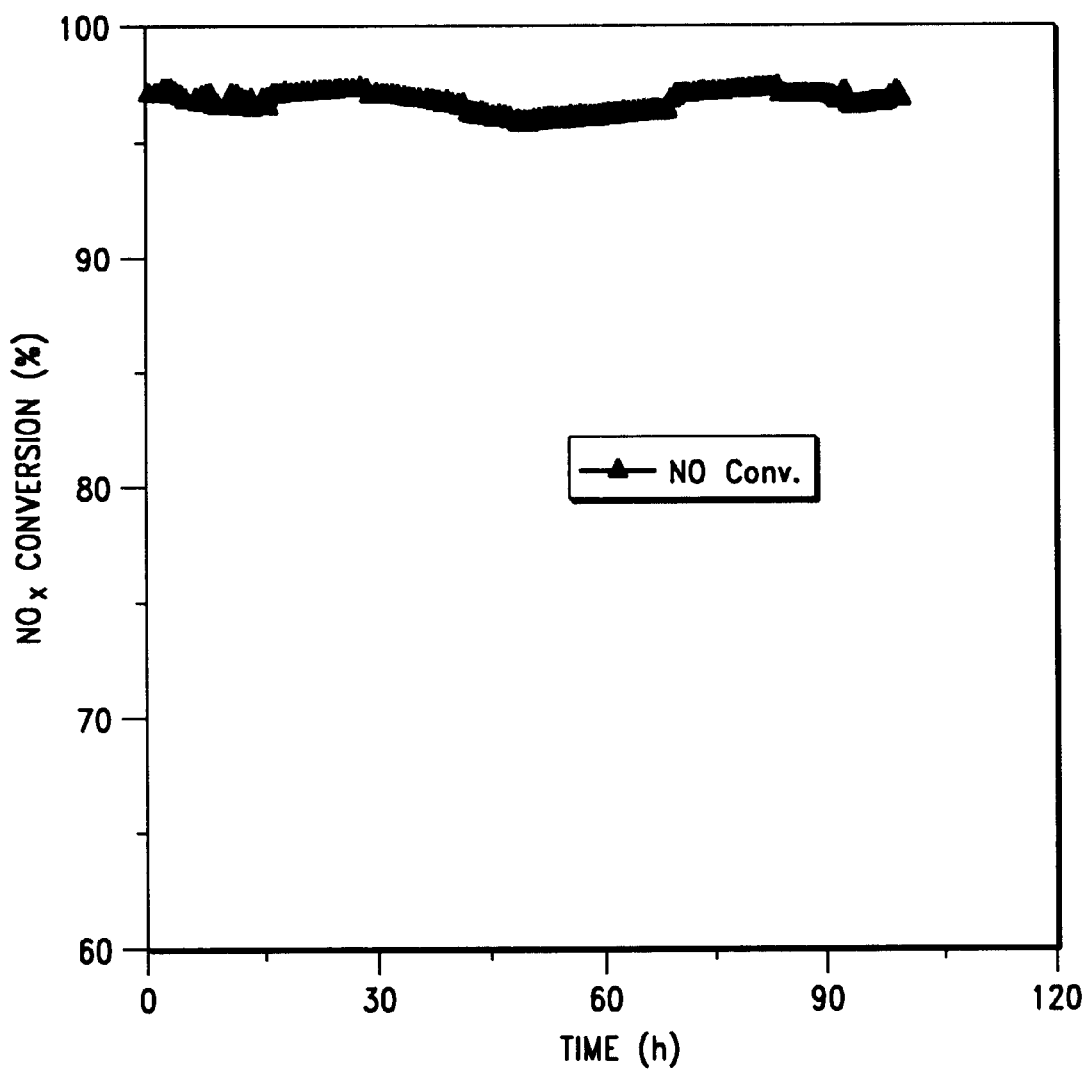
FIG. 7 is a graph showing the effect of time on $NO_x$ conversion of the 1.0% $CeO_2$/Fe—$TiO_2$-PILC catalyst in the presence of $H_2O$ and $SO_2$. The reaction conditions are: T=375° C., 0.2 g catalyst, [NO]=[$NH_3$]=1000 ppm, [O2]=2%, [$H_2O$]=8%, [$SO_2$]=1000 ppm, He=balance, total flow rate=500 ml/min and GHSV=113 000 l/h.

Another important criteria for catalyst performance is the effect of time-on-stream on the SCR activity which is the time a catalyst is exposed to the gas stream. The effect of time-on-stream on the SCR activity of $NO_x$ by $NH_3$ in the presence of $H_2O$ and $SO_2$ for a catalyst composition of the present invention containing 1.0% $CeO_2$/Fe—$TiO_2$-PILC is shown in FIG. 7. As shown the 1.0%$CeO_2$/Fe—$TiO_2$-PILC is a stable catalyst in the SCR reaction. During 100 hours on stream at 375° C., under the conditions of 1000 ppm NO, 1000 ppm $NH_3$, 2% $O_2$, 8% $H_2O$, 1000 ppm $SO_2$ and GHSV=113 000 l/h, the $NO_x$ conversion remained at ca. 96–97%, and the selectivity to $N_2$ was about 99%. No decrease in the activity and product selectivity were detected.

Oxidation of $SO_2$ to $SO_3$ causes severe problems for the SCR reaction due to the formation of sulfuric acid, ammonium sulfate and other compounds. Conventional vanadia-based catalysts have a high $SO_2$ oxidation activity, which has been a major concern in SCR operations. Efforts have been made to either add certain oxides (such a $WO_3$ or $GeO_2$) to the $V_2O_5$ catalyst or to use non-$V_2O_5$ catalysts for the purpose of decreasing $SO_2$ oxidation activity while maintaining high $NO_x$ reduction activity. To test the $SO_2$ oxidation activity of the catalyst compositions of the present invention, the wet chemical method described in the foregoing was used to quantitatively measure the amounts of $SO_3$ generated in the reaction effluents. $SO_2$ conversions were obtained at 375° C. under the conditions of 1000 ppm NO, 1000 ppm $NH_3$, 2% $O_2$, 8% $H_2O$, 1000 ppm $SO_2$ and GHSV=113 000 l/h. The conversions for $SO_2$ to $SO_3$ were 2.1%, 2.0%, 1.2% and 8.0%, respectively, for the Fe—$TiO_2$-PILC, 1.0%$CeO_2$/Fe—$TiO_2$-PILC and Ce—Fe—$TiO_2$-PILC of the present invention, and a conventional 4.4%$V_2O_5$-8.2%$WO_3$/$TiO_2$ catalysts. The catalysts containing iron yield much lower $SO_3$ than the $V_2O_5$-based catalyst. Results by Clark et al., in their study of alumina supported from oxide and vanadium oxide catalysts, also showed that $Fe_2O_3$ was less active in $SO_2$ oxidation than $V_2O_5$. The low $SO_2$ oxidation activity is another significant advantage exhibited by the $Fe^{3+}$-exchanged $TiO_2$-PILC catalyst of the present invention over the conventional $V_2O_5$-$WO_3$/$TiO_2$ catalyst.

Comparison of SCR Activity of the Catalysts

The selective catalytic reduction activity exhibited by a catalyst is an important factor. The SCR activity can be represented quantitatively by a first-order rate constant (k), since the reaction is known to be first order with respect to NO (under stoichiometric $NH_3$ conditions) on a variety of metal oxides. By assuming a plug flow reactor (in a fixed bed of catalyst) and free of diffusion limitation, the rate constant can be calculated from the $NO_x$ conversion (X) by:

$$k = -\frac{F_0}{[NO]_0 W} \ln(1-X) \qquad (1)$$

where $F_0$ is the molar NO feed rate, $[NO]_0$ is the molar NO concentration at the inlet (at the reaction temperature), and W is the catalyst amount (g). According to the data shown in FIGS. 1, 3 and 5, the first-order rate constants of the SCR reaction on the above catalysts were calculated. The rate constants are compared in Table 1 below.

TABLE 1

First-order rate constants of the catalysts.

| Catalyst | Rate constant (k, cm$^3$/g/s) without H$_2$O and SO$_2$ | | | Rate constant (k, cm$^3$/g/s) with H$_2$O and SO$_2$ | | |
|---|---|---|---|---|---|---|
|  | 350° C. | 375° C. | 400° C. | 350° C. | 375° C. | 400° C. |
| Fe—Al$_2$O$_3$-PILC | 123 | 139 | 123 | — | — | - |
| Cr—Al$_2$O$_3$-PILC | 118 | 91 | 62 | — | — | — |
| Cu—Al$_2$O$_3$-PILC | 93 | 81 | 61 | — | — | — |
| Fe—TiO$_2$-PILC | 185 | 200 | 192 | 218 | 255 | 292 |
| 1.0% CeO$_2$/Fe—TiO$_2$-PILC | 200 | 229 | 217 | 261 | 318 | 395 |
| Ce—Fe—TiO$_2$-PILC | 260 | 408 | 464 | 336 | 510 | 606 |
| 4.4% V$_2$O$_5$-8.2% WO$_3$/TiO$_2$ | 177 | 192 | 192 | 177 | 192 | 192 |
| Commercial V$_2$O$_5$ Catalyst (Company X)[a] | — | 158 | — | — | 129 | — |

[a] Data was obtained from J. P. Chen et al., "Iron Oxide and Chromia Supported on Titania-Pillared Clay for Selective Catalytic Reduction of Nitric Oxide with Ammonia", J. Catal. 151, 135 (1995).
Reaction conditions: [NO] = [NH$_3$] = ppm, [O$_2$] = 2%, [H$_2$O] = 8% (when used), [SO$_2$] = 1000 ppm (when used), He = balance and total flow rate = 500 ml/min.

In the absence of $H_2O$ and $SO_2$, the rate constants for various catalyst compositions of the present invention were found to increase in the order of Cu—$Al_2O_3$-PILC<Cr—$Al_2O_3$-PILC<Fe—$Al_2O_3$-PILC<4.4%$V_2O_{0.5}$-8.2%$WO_3$/$TiO_2$<Fe—$TiO_2$-PILC<1.0%$CeO_{0.2}$/Fe—$TiO_2$-PILC<Ce—Fe—$TiO_2$PILC. The Ce—Fe—$TiO_2$-PILC catalyst was the most active catalyst for the SCR reaction. When $H_2O$ and $SO_2$ were added, the activities of the three Fe—$TiO_2$-PILC catalysts were further increased. The Ce—Fe—$TiO_2$-PILC catalyst was more than three times as active as the conventional vanadia catalyst under the same conditions with $SO_2$ and $H_2O$ at 400° C.

The $Fe^{3+}$-exchanged titania-pillared clay catalysts of the present invention (promoted by cerium) showed very high $NO_x$ conversion in the SCR reaction by ammonia, which were up to more than three times as active as the commercial $V_2O_5$—$WO_3$/$TiO_2$ catalyst. The pillared clay catalysts also had a higher $N_2$/$N_2O$ product selectivity and a substantially lower activity for $SO_2$ oxidation to $SO_3$ than the commercial catalyst. A 100-hour run in the presence of $H_2O$ and $SO_2$ for the 1.0% $CeO_2$/Fe—$TiO_2$-PILC catalyst showed no reduction in activity.

As taught by the foregoing description and examples, a superior pillared clay catalyst for selective catalytic reduction of nitrogen oxides is provided by the present invention. The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

We claim:

1. A catalyst for selective catalytic reduction of nitrogen oxide compounds with ammonia, comprising:
   a composition of one or more pillared interlayered clays (PILC);
   one or more metal ions exchanged with said pillared interlayered clays; and
   one or more promoter ions exchanged with said pillared interlayered clays.

2. The catalyst of claim 1 wherein said pillared interlayered clays are selected from the group consisting of $Al_2O_3$-PILC, $TiO_2$-PILC, $ZrO_2$-PILC, $SiO_2$-PILC and $Fe_2O_3$-PILC.

3. The catalyst of claim 1 wherein said metal ions are selected from the group consisting of $Fe^{3+}$, $Cr^{3+}$, $Mn^{2+}$, $Co^{2+}$, $Ni^{2+}$, $Cu^{2+}$, $V^{3+}$, $V^{2+}$, $VO^{2+}$ and mixtures thereof.

4. The catalyst of claim 1 wherein said promoter ions are selected from the group consisting of Ce, La, Pr, Nd, Sm, Gd, Tb and mixtures thereof.

5. The catalyst of claim 1 wherein the percent of metal ions exchanged is in the range of approximately 10% to 400%.

6. The catalyst of claim 1 wherein the percent of metal ions exchanged is in the range of approximately 100% to 300%.

7. The catalyst of claim 1 wherein the percent of metal ions exchanged is approximately 200%.

8. The catalyst of claim 1 wherein said promoter ions are present at a concentration in the range of approximately 0.1–4% wt.

9. The catalyst of claim 8 wherein said promoter ions are present at a concentration in the range of approximately 1–2% wt.

10. A catalyst for selective catalytic reduction of nitrogen oxide compounds with ammonia wherein said catalyst is selected from the group consisting of:
   Fe—$Al_2O_3$-PILC, Cr—$Al_2O_3$-PILC, Cu—$Al_2O_3$-PILC, Fe—$TiO_2$-PILC, $CeO_2$/Fe—$TiO_2$-PILC and Ce—Fe—$TiO_2$-PILC.

11. The catalyst of claim 10 wherein said catalyst is Ce—Fe—$TiO_2$-PILC.

12. The catalyst of claim 10 wherein said catalyst is 1.0% $CeO_2$/Fe—$TiO_2$-PILC.

* * * * *